Patented Mar. 14, 1950

2,500,449

UNITED STATES PATENT OFFICE 2,500,449

COMPOSITIONS OF MATTER CONTAINING GLYCIDYL ETHERS AND OXALIC ACID

Theodore F. Bradley, Oakland, Calif., assignor to Shell Development Company, San Francisco, Calif., a corporation of Delaware No Drawing. Application March 29, 1948,
Serial No. 17,798

11 Claims. (Cl. 260—47)

1

This invention relates to compositions of matter which are heat curable to valuable materials and are useful in the manufacture of varnishes, enamels, molding compositions, adhesives, films, fibers, molded articles, etc. More particularly, the invention is concerned with reacting and curing of glycidyl ethers to resinous products with oxalic acid whereby especially advantageous results are obtained.

According to the present invention, an ether containing glycidyl groups so as to have an epoxy equivalency greater than one is mixed and reacted with oxalic acid. The glycidyl ethers contained in the compositions of the invention have at least six carbon atoms and one or more ethereal oxygen atoms. In order that the composition will cure by reaction with the oxalic acid into material of high molecular weight and resinous character, the glycidyl ether has a 1,2-epoxy equivalency which is greater than one. By the epoxy equivalency, reference is made to the average number of 1,2-epoxy groups

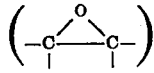

contained in the average molecule of the ether. In the case where a substantially pure, simple compound is used, the epoxy equivalency will be an integer of two or more. For example, the epoxy equivalency of diglycidyl ether, or of the diglycidyl ether of ethylene glycol is two, while that of the triglycidyl ether of glycerol is three. However, the glycidyl ether may be a mixture of chemical compounds which, although they are of similar identity and chemical constitution, have different molecular weights. The measured molecular weight of the mixture, upon which the epoxy equivalency is dependent, will necessarily be an average molecular weight. Consequently, the epoxy equivalency of the glycidyl ether mixture will not necessarily be an integer of two or more, but will be a value which is greater than one. For example, a glycidyl ether particularly suitable for use in the invention is that made by reacting bis-(4-hydroxyphenyl)-2,2-propane with epichlorhydrin in alkaline solution at a mol ratio of about 1.4 mols of epichlorhydrin per mol of the dihydric phenol. The product is a resinous mixture of glycidyl ethers having a measured average molecular

2 weight of 791. Analysis shows the product to contain about 0.169 equivalent of epoxy groups per 100 grams. Consequently, the product has an epoxy equivalency of about 1.34—i. e., an average of about 1.34 epoxy groups per molecule.

The glycidyl ethers used in the invention preferably contain only the elements carbon, hydrogen and oxygen. They include 1,2-epoxy-containing polyethers of polyhydric alcohols such as polyglycidyl ethers thereof like diglycidyl ether of ethylene glycol, propylene glycol, trimethylene glycol, butylene glycol, diethylene glycol, triethylene glycol, glycerol, dipropylene glycol and the like. Other typical ethers of this class include glycidyl ethers of polyhydric alcohols having a 1,2-epoxy equivalency greater than one such as the polyglycidyl ethers of glycerol, diglycerol, erythritol, pentaglycerol, pentaerythritol, mannitol, sorbitol, polyallyl alcohol, polyvinyl alcohol and the like. The polyglycidyl polyethers of the polyhydric alcohols are prepared by reacting the polyhydric alcohol with epichlorohydrin in the presence of 0.1 to about 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mol of epichlorhydrin for each molecular equivalent of hydroxyl group in the polyhydric alcohol. Thus, in preparing the ether of diethylene glycol, which glycol contains two hydroxyl groups in each molecule thereof, about two mols of epichlorhydrin for each mol of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of the polyhydric alcohols may be illustrated by considering application of the foregoing method in preparing the glycidyl ether of glycerol. In parts by weight, about 276 parts of glycerol (3 mols) are mixed with 828 parts of epichlorhydrin (9 mols). To this reaction mixture are added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours.

About 370 parts of the resulting glycerol-epichlorhydrin condensate are dissolved in 900 parts of dioxane containing about 300 parts of sodium aluminate. While agitating, the reaction mixture is heated and refluxed at 93° C. for about 9 hours. After cooling to atmospheric temperature, the insoluble material is filtered from the reaction mixture and low boiling substances removed by distillation to a temperature of 205° C. at 20 mm. pressure. The epoxy ether, in amount of 261 parts, is a pale yellow, viscous liquid. It has an epoxide value of 0.671 equivalent per 100 grams and the molecular weight is 324 as measured ebulloscopically in a dioxane solution. These values show that the glycidyl ether has an epoxy equivalency of 2.18, i. e., an average of 2.18 epoxide groups per molecule.

The 1,2-epoxide value of the glycidyl ether is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

A preferred group of epoxy ethers with which oxalic acid reacts with particular advantage to give material of superior properties is that prepared by reacting a dihydric phenol with epichlorhydrin in alkaline solution. These products are of resinous character and when used in the compositions of the invention, enable valuable materials, resistant against solvents, to be obtained upon curing with the oxalic acid. Any of the various dihydric phenols are used in preparing the glycidyl ethers including mononuclear phenols like resorcinol, catechol, hydroquinone, etc., or polynuclear phenols like bis-(4-hydroxyphenyl)-2,2-propane(bisphenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary butyl phenyl)-2,2-propane, bis-(2-dihydroxynaphthyl)-methane, 1,5-dihydroxy naphthalene, etc.

The glycidyl ethers of the dihydric phenols are made by heating at 50° C. to 150° C. the dihydric phenol with epichlorhydrin, using one to two or more mols of epichlorhydrin per mol of the dihydric phenol. Also present is a base such as sodium, potassium, calcium or barium hydroxide in amount of 10 to 30% stoichiometric excess of the epichloryhdrin—i. e., 1.1 to 1.3 equivalents of base per mol of epichlorhydrin. The heating is continued for several hours to convert the reaction mixture to a taffy-like consistency whereupon the reaction product is washed with water until free of base. Although the product is a complex mixture of glycidyl ethers, the principal product may be represented by the formula

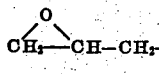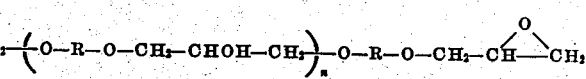

wherein R represents the divalent hydrocarbon radical of the dihydric phenol and $n$ is an integer of the series 0, 1, 2, 3, etc. The length of the chain can be made to vary by changing the molecular proportion of epichlorhydrin and dihydric phenol. Thus by decreasing the mols of epichlorhydrin per mol of dihydric alcohol from about two downwards toward one, the mocecular weight and the softening point of the resinous glycidyl ether is increased. In general, these glycidyl ethers, having an epoxy equivalency between one and two, contain terminal 1,2-epoxy groups, and have alternate aliphatic and aromatic groups linked together by ethereal oxygen atoms.

The nature of the gycidyl ethers from dihydric phenols can be better understood by considering preparation of a particular product which I prefer to use in my invention. This product will hereinafter be designated by the term Resin A.

RESIN A

In a reaction vessel fitted with a stirrer, 4 mols of bis-(4-hydroxphenyl)-2,2-propane (bisphenol) and 5 mols of epichlorhydrin are added to 6.43 mols of sodium hydroxide as a 10% aqueous solution. While being stirred, the reaction mixture is gradually heated to about 100° C. during 80 minutes time and is maintained at 100–104° C. for an additional 60 minutes under reflux. The aqueous layer is decanted and the resin washed with boiling water until neutral to litmus whereupon the resin is drained and dehydrated by heating to about 150° C.

The resulting resinous glycidyl ether has a softening point of 100° C. (Durran's Mercury Method) and a molecular weight of 1133 measured by boiling point elevation of a dioxane solution. The epoxide value is 0.116 equivalent per 100 grams so the epoxide equivalency is 1.32 epoxide groups per molecule.

In like manner, other resinous glycidyl ethers of bis-phenol may be prepared which will have different molecular weights depending upon the molar ratio of epichloryhdrin to dihydric phenol used in preparation thereof. This fact is illustrated by the following table which shows the variation in properties with variation in the molar ration.

| Mol Ratio Epic<sup>1</sup> lorhydrin to bis-Phenol | Mol Ratio NaOH to Epichlorhydrin | Softening Point °C. | Molecular Weight | Equiv. Epoxy per 100 gms. | Epoxy Groups per Mol |
|---|---|---|---|---|---|
| 2.15 | 1.1 | 43 | 451 | 0.318 | 1.39 |
| 1.4 | 1.3 | 84 | 791 | 0.169 | 1.34 |
| 1.33 | 1.3 | 90 | 802 | 0.137 | 1.10 |
| <sup>1</sup>1.25 | 1.3 | 100 | 1,133 | 0.116 | 1.32 |
| 1.2 | 1.3 | 112 | 1,420 | 0.085 | 1.21 |

<sup>1</sup> Resin A.

These glycidyl ethers from bis-phenol are a complex mixture of compounds believed to have as the principal component thereof a substance which may be represented by the formula

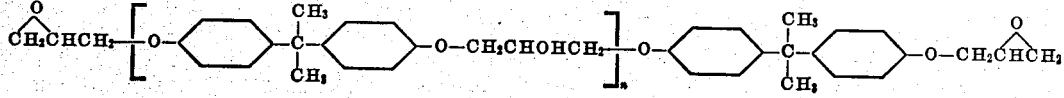

wherein $n$ is an integer of the series 0, 1, 2, 3, etc. It may be noted that the observed molecular weight and epoxy value are probably low due to inherent inaccuracies of the methods of determining the values. The determined epoxy value appears to be only about 60% of the theoretical value, but in any event the epoxy equivalency is greater than one and the resinous glycidyl ethers cure to hard, tough, insoluble and infusible resins upon heating with oxalic acid.

The composition of the invention comprises (1) a glycidyl ether having a 1,2-epoxy equivalency greater than one, and (2) oxalic acid. The relative amounts of the two essential components of the composition may be varied. There may be used approximately an equivalent amount of oxalic acid—i. e., such an amount that there is one carboxylic acid group for each 1,2-epoxy group in the ether. For example, when diglycidyl ether is used with oxalic acid, the ether has an epoxy value of about 1.54 equivalents of epoxy per 100 grams and the oxalic acid has an acid value of about 2.22 equivalents of acid per 100 grams so there may be used about 69 parts by weight of the acid with each 100 parts by weight of the ether. Likewise, when the glycidyl ether of bis-phenol is used such as Resin A having an epoxy value of about 0.116 equivalent of epoxy per 100 grams, the composition may contain about 5.2 parts by weight of oxalic acid for each 100 parts of the glycidyl ether.

The oxalic acid used as curing agent in the composition of the invention is ordinarily added to the glycidyl ether as oxalic acid dihydrate, which form is commercially available. Oxalic acid dihydrate contains two molecules of water of crystallization and has an acid equivalency of 1.59 per 100 grams. When using equivalent amounts of oxalic acid dihydrate with the above-exemplified ethers, there would be employed 97 grams of the dihydrate per 100 grams of diglycidyl ether and 7.3 grams per 100 grams of Resin A.

The proportion of oxalic acid used in the composition of the invention may vary over wide limits. Good results with curing to infusible products are obtained when 60% to 170% of the equivalent amount of acid is used. Ordinarily it is preferred to use a small excess over the equivalent amount of acid such as about 110% to 160% of the equivalent amount since optimum cures appear to be obtained with about 150% of the equivalent amount of acid. If desired, however, proportions from about 5% to 300% of the equivalent amount may be used, or even higher or lower percentages.

The compositions of the invention are best reacted or cured by heating at a temperature of 50° C. to 250° C. At the lower portion of the range, the rate of reaction is somewhat slow, but by operating at a preferred temperature of 125° C. to 175° C., the reaction is complete in from about 10 minutes to an hour's time. The very slow rate of reaction at ordinary temperatures, say 20° C. to 25° C., is of particular value in the use and application of the composition. At such ordinary temperatures, the composition is stable for several days' time. Consequently, the oxalic acid may be mixed with the glycidyl ether and it is not necessary immediately to apply the composition for the purpose intended such as protective coatings, molding materials and the like. Upon application of heat to the composition, it is rapidly converted to the reacted product.

The compositions of the invention are particularly useful for protective coatings by dissolving in an organic solvent and applying the solution to a surface with subsequent curing of the film of resin-forming material. Various solvents are suitable for this purpose such as lower saturated ketones like acetone, methyl ethyl ketone, methyl isobutyl ketone, methyl hexyl ketone, cyclohexanone, methyl cyclohexanone, etc.; esters like ethyl acetate, isopropyl acetate, butyl acetate, isoamyl acetate, etc.; and monoalkyl ethers of ethylene glycol like methyl, ethyl or butyl ethers. Preferably such solvents have a boiling point below 175° C. If desired, other materials like lower aromatic hydrocarbons such as benzene, toluene and/or xylene may be used in combination with the oxygen-containing compounds for the purpose of cheapening the cost of the solvent.

The solutions of the composition of the invention are applied for coating surfaces needed to be protected by brushing, spraying and the like. The amount of solvent contained in the solution may be varied to suit the particular need. Ordinarily, the solution will contain about 5% to 60% of the composition of the invention. The solution is applied to the surface to be coated, and either the solvent is first allowed to evaporate, after which heat is applied by circulating hot air or by use of infra-red lamps, or the heating is effected with simultaneous removal of solvent and curing.

The coated surfaces containing a film of the cured composition have very desirable properties and this is especially true when the epoxy ether used in the composition is a glycidyl ether of a dihydric phenol such as Resin A, for example. When cured, the resulting film is resistant to attack by acids such as 50% sulfuric acid. The film is remarkably resistant to the action of alkalis as distinguished from most film-forming materials such as unsaturated fatty oils and oil-modified alkyds. Thus, it may be boiled in 5% aqueous sodium hydroxide without harm.

The following examples are given for the purpose of illustrating use of the composition of the invention as surface coating materials:

*Example I*

A composition was prepared for the purpose of testing oxalic acid as a curing agent when a surface coating film was prepared from the composition. A clear varnish was prepared by dissolving an equal part by weight of Resin A in methyl ethyl ketone. To the solution was added 8.3% of oxalic acid dihydrate based on the weight of the resin. The solution was spread on a glass panel with the aid of a doctor blade and dried at room temperature for an hour's time during which the solvent evaporated. The coated panel was then baked for 30 minutes' time at 150° C. A smooth film of about 0.001 inch thick was obtained which was very hard and tough. The hardness and toughness was observed in the following manner:

A film is considered hard when it is not scratchable with a thumbnail, fairly hard when only slightly scratchable, and soft when a deep scratch is readily made. A film is considered tough when a long, coherent ribbon may be removed by a knife-point being pushed in the film as a plow, and when the resistance to the motion of the knife-point is considerable. A film is considered brittle when a knife-point, moved as a plow, produces a shower of chips. In order to be satisfactory as a surface-covering film, it is not only necessary that the cured resin be hard so as to resist wear and abrasion, but that it also be tough, rather than brittle, so as to have physical strength necessary for resistance to strain and shock.

For purposes of comparison, a cured film was prepared in like manner except that 12% of itaconic acid based on the weight of resin was used in place of the oxalic acid as curing agent. The resulting film was unsatisfactory in being rather soft as well as brittle.

Another cured film was prepared using 8.8% maleic anhydride based on the weight of resin. The resulting film was fairly soft in being scratchable with a thumbnail and was also unsatisfactory in not being tough.

In order to test succinic acid, it was necessary to substitute the methyl ether of ethylene glycol for methyl ethyl ketone in order to obtain a homogeneous solution; 10% of succinic acid based on the weight of resin was used. The resulting film was also unsatisfactory by being soft and brittle.

*Example II*

A solution consisting of equal parts of Resin A in methyl ethyl ketone was prepared. To the solution was added 10.9% of oxalic acid dihydrate based on the weight of resin. The mixture was warmed to assist dissolving the acid. A cured film was formed by spreading the composition on a glass panel and baking for 30 minutes at 150° C. as described in Example I.

The resulting film was harder and tougher than that formed when the lesser amount (8.3%) of oxalic acid was used. Moreover, upon preparing another film from the composition containing 10.9% oxalic acid dihydrate with curing effected by baking for only 15 minutes at 150° C., it was found that this film had cured to a hard, tough material.

*Example III*

Another panel was prepared from the composition described in Example I wherein oxalic acid was used, the curing being effected by baking for 30 minutes at 150° C. The panel coated with the hard, tough film was placed in the open air so as to face southerly. Examination after a month's exposure to the weather showed the film to be still smooth and hard with no measurable loss of toughness.

*Example IV*

A number of panels were prepared with coatings obtained from a composition containing equal parts of Resin A in methyl ethyl ketone to which had been added 8% of oxalic acid dihydrate with curing of the film for 30 minutes at 150° C.

The cured films were unchanged after immersion for 18 hours in water at 25° C., or for one-half hour in lubricating oil at 100° C. Spot tests with the following reagents also left the films unchanged: 15 minutes with toluene, 30 minutes with 2% acetic acid, or 30 minutes with 2% sodium hydroxide. The films had a Sward hardness of 43 and a Taber abrasion of 2.9 mg. per 100 cycles.

When used as film-forming agents for protective coatings, the composition may have various other materials incorporated therewith besides solvents such as pigments and other resins. Thus pigments like titanium oxide, antimony oxide, carbon black, chrome yellow, zinc oxide, para red, and the like, may be used. Depending upon the hiding power of the particular pigment, about 5% to 200% pigment based on the weight of the glycidyl ether may be used in the enamels. Best results in preparing the enamels are obtained by grinding the pigment with a portion of the solvent and epoxy ether, and then adding the remainder of the solvent and epoxy ether after the grinding operation. The enamel is ready for application upon addition of the curing agent, oxalic acid.

The enamel films obtained from the composition of the invention for use as protective coatings have very desirable properties. They have a flat finish which is particularly useful. Moreover, the cured films are very resistant against yellowing produced by prolonged heating.

Aliphatic diamines are useful agents for effecting the curing of the glycidyl ethers used in the compositions of the present invention. However, the films cured with the aid of diamines, although hard and tough, are subject to marked discoloration. The superiority of films cured with oxalic acid in this respect is evident from the following results.

*Example V*

An enamel base was prepared containing 30.8% by weight of Resin A, 30.8% titanium dioxide pigment and 38.4% of the monomethyl ether of ethylene glycol. The curing agents indicated in the table below were added to portions of the enamel base, the percentage being based on the weight of resin. Films of the enamels were applied to the surface of steel panels. After drying for about an hour, the films were cured by baking at 150° C. for 30 minutes. A second coat was applied in the same manner.

The tendency of the cured enamel films to yellow was tested by heating for 24 hours at 150° C. with observations of the change in color. In the table below, the color scale was such that the numeral 0 indicates the film was pure white and the numeral 5 indicates a light ivory color, while intermediate numerals have reference to uniform graded variations therebetween.

| Curing Agent | Color after Curing | Color after Baking 24 hours |
|---|---|---|
| 8% Oxalic acid dihydrate | 0 | 0 |
| 4% Diethylene triamine | 2 | 5 |

With either varnishes or enamels containing the compositions of the invention, thick layers of the film-forming material may be applied to a surface. Curing completely therethrough is attained because the conversion to an insoluble film is not dependent upon contact with air. This fact also makes the compositions valuable in manufacture of laminates wherein the laminae are cloth, paper, glass-cloth and the like. Such laminae are impregnated with the composition which is ordinarily dissolved in a volatile solvent like acetone. After drying, and, if desired, partial curing, the impregnated sheets are stacked and the cure completed in a press using sufficient pressure to form a homogeneous and coherent mass for the resin-forming material such as 200 to 1000 or more pounds per square inch.

The new compositions possess a peculiar and unexpected property making them particularly suitable for molding operations. Most resin-forming materials contract in volume during curing thereof. In contrast, the compositions of the invention tend to expand during curing. Consequently, upon manufacturing molded articles from the compositions by introducing the composition into a mold with application of the curing heat and pressure, the resin-forming material flows and fills the mold sharply so that excellent molded articles are obtained. Various fillers, dyes, and pigments may be incorporated with the composition used for molding such as wood flour, talc, alpha-cellulose zinc sulfide, etc.

Other enamels containing the composition of the invention wherein various pigments and solvents were used are illustrated by the following examples. The enamel bases were prepared by grinding the constituents in a Banbury mill.

Example VI

An enamel base was prepared of the following composition by weight:

|  | Per cent |
| --- | --- |
| Resin A | 26.8 |
| Titanium dioxide pigment | 26.8 |
| Methyl ethyl ketone | 18.1 |
| Monomethyl ether of ethylene glycol acetate | 15.1 |
| Xylene | 13.2 |

To the base was added 8% oxalic acid dihydrate as a 50% solution in the monomethyl ether of ethylene glycol, the amount of acid being based on the weight of Resin A in the composition. The enamel was then diluted with the same solvent mixture as in the base to a viscosity of 15 seconds measured with a glass cup like the Ford viscosity cup. The enamel was flowed out on a steel panel, allowed to dry for an hour and then baked at 150° C. for 30 minutes. The resulting white film was hard and tough with a flat finish. Upon exposure to ultraviolet light from a General Electric AH5 mercury arc lamp at a distance of 28 cm. for 15 days, there was only barely perceptible darkening of the film.

Example VII

The enamel base had the following composition by weight:

|  | Per cent |
| --- | --- |
| Resin A | 21.9 |
| Para red (light shade) pigment | 21.0 |
| Methyl ethyl ketone | 21.0 |
| n-Butyl acetate | 18.5 |
| Xylene | 18.5 |

Oxalic acid dihydrate as a 50% solution in the monomethyl ether of ethylene glycol was added to the extent of 8% acid based on the weight of Resin A after which the enamel was diluted with the same solvent mixture as in the base to a viscosity of 15 seconds measured with a glass cup like the Ford viscosity cup. The enamel was flowed out on a steel panel, allowed to dry for an hour, and then baked at 150° C. for 30 minutes. The resulting hard film had an excellent flat red finish. The darkening was only just perceptible upon exposing the film to ultraviolet light from a General Electric AH5 mercury lamp for 10 days at a distance of 28 cm.

Example VIII

An enamel base of the following composition by weight was prepared:

|  | Per cent |
| --- | --- |
| Resin A | 39.8 |
| Chrome yellow pigment | 26.5 |
| Monobutyl ether of ethylene glycol | 17.4 |
| Xylene | 16.3 |

A 50% solution of oxalic acid dihydrate in monomethyl ether of ethylene glycol was added as curing agent in amount of 8% acid based on the weight of Resin A. The enamel was flowed out on a steel panel, allowed to dry for an hour, and then baked for 30 minutes at 150° C. The cured film was a hard, flat, yellow material.

Example IX

The base of the enamel was of the following composition by weight:

|  | Per cent |
| --- | --- |
| Resin A | 49.8 |
| Carbon black pigment | 4.1 |
| Monobutyl ether of ethylene glycol | 23.8 |
| Xylene | 22.3 |

The curing agent added to the enamel base was 8% of oxalic acid dihydrate as a 50% solution in monomethyl ether of ethylene glycol, the per cent of acid being based on the weight of Resin A. The enamel was flowed out on a steel panel, allowed to dry for an hour, and then baked for 30 minutes at 150° C. The resulting film was hard and tough, and had a semi-glossy black finish.

I claim as my invention:

1. A composition of matter comprising an ether of the class consisting of a glycidyl ether of a dihydric phenol and a glycidyl ether of a polyhydric alcohol, and 5% to 300% of the equivalent amount of oxalic acid, said ether having a 1,2-epoxy equivalency greater than one and containing no other reactive functional groups than epoxy and hydroxyl groups.

2. A composition of matter comprising a glycidyl ether of a dihydric phenol having a 1,2-epoxy equivalency greater than one, and 60% to 170% of the equivalent amount of oxalic acid, said ether containing no other reactive functional groups than epoxy and hydroxyl groups.

3. A composition of matter comprising a glycidyl ether of bis-(4-hydroxyphenyl)-2,2-propane having a 1,2-epoxy equivalency of greater than one, and 60% to 170% of the equivalent amount of oxalic acid.

4. A heat curable enamel comprising a fluid mixture of a lower aliphatic ketone, a metal oxide pigment, a glycidyl ether of bis-(4-hydroxyphenyl)-2,2-propane having a 1,2-epoxy equivalency greater than one, and oxalic acid in amount of 110% to 160% of the equivalent amount of said glycidyl ether.

5. A composition of matter comprising a glycidyl ether of glycerol having a 1,2-epoxy equivalency greater than one and 60% to 170% of the equivalent amount of oxalic acid.

6. A process for producing a resinous product which comprises heating and reacting 60% to 170% of the equivalent amount of oxalic acid with a glycidyl ether having a 1,2-epoxy equivalency greater than 1.0 which is of the formula

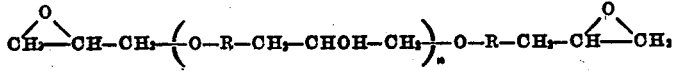

wherein R represents the divalent hydrocarbon radical of a dihydric phenol and $n$ is an integer.

7. The resinous product obtained by the process defined in claim 6.

8. A process for producing a resinous product which comprises heating at 50° C. to 250° C. a glycidyl ether of a dihydric phenol having a 1,2-epoxy equivalency greater than one with 60% to 170% of the equivalent amount of oxalic acid.

9. The resinous product obtained by the process defined in claim 8.

10. A process for producing a resinous product which comprises heating at 125° C. to 175° C. a glycidyl ether of bis-(4-hydroxyphenyl)-2,2-propane having a 1,2-epoxy equivalency greater than one with 110% to 160% of the equivalent amount of oxalic acid.

11. The resinous product obtained by the process defined in claim 10.

THEODORE F. BRADLEY.

REFERENCES CITED

The following references are of record in the file of this patent:

UNITED STATES PATENTS

| Number | Name | Date |
|---|---|---|
| 2,324,483 | Caston | July 20, 1943 |
| 2,399,214 | Evans | Apr. 30, 1946 |